(12) United States Patent
Yasutake et al.

(10) Patent No.: US 7,029,639 B2
(45) Date of Patent: Apr. 18, 2006

(54) DESULFURIZER COMPRISING ACTIVATED CARBON AND METHOD OF DESULFURIZATION

(75) Inventors: Akinori Yasutake, Nagasaki (JP);
Norihisa Kobayashi, Tokyo (JP);
Takashi Kurisaki, Nagasaki (JP);
Masaaki Yoshikawa, Osaka (JP)

(73) Assignees: Osaka Gas Co., Ltd., Osaka (JP);
Mitsubishi Heavy Industries, Ltd., Tokyo (JP)

( * ) Notice: Subject to any disclaimer, the term of this patent is extended or adjusted under 35 U.S.C. 154(b) by 389 days.

(21) Appl. No.: 10/296,216

(22) PCT Filed: Apr. 3, 2002

(86) PCT No.: PCT/JP02/03329

§ 371 (c)(1),
(2), (4) Date: Apr. 21, 2003

(87) PCT Pub. No.: WO02/081064

PCT Pub. Date: Oct. 17, 2002

(65) Prior Publication Data

US 2003/0190270 A1    Oct. 9, 2003

(30) Foreign Application Priority Data

Apr. 4, 2001  (JP)  ............................. 2001-105384

(51) Int. Cl.
*B01D 53/50* (2006.01)
*B01D 53/56* (2006.01)
*B01D 53/86* (2006.01)
*C01B 17/78* (2006.01)
*C01B 17/80* (2006.01)

(52) U.S. Cl. ............... 423/244.09; 422/170; 422/171; 422/172; 422/177; 423/244.01; 423/522

(58) Field of Classification Search ........... 423/244.01, 423/244.09, 522; 422/168–172, 177
See application file for complete search history.

(56) References Cited

U.S. PATENT DOCUMENTS

| 3,531,664 A | | 9/1970 | Hals | |
|---|---|---|---|---|
| 4,004,995 A | * | 1/1977 | Machi et al. | ............ 204/157.3 |
| 4,011,298 A | * | 3/1977 | Fukui et al. | ................. 423/235 |

(Continued)

FOREIGN PATENT DOCUMENTS

| JP | 49-36572 | 4/1974 |
|---|---|---|
| JP | 9-108542 | 4/1997 |
| WO | 82/1348 | 9/1982 |

OTHER PUBLICATIONS

English Translation of JP 49-36572, published Apr. 4, 1974.*

(Continued)

*Primary Examiner*—Stanley S. Silverman
*Assistant Examiner*—Ardith E. Hertzog
(74) *Attorney, Agent, or Firm*—Oblon, Spivak, McClelland, Maier & Neustadt, P.C.

(57) ABSTRACT

A desulfurization apparatus for desulfurizing a flue gas containing sulfur oxides through contact with a porous carbon material. The carbon material, which is provided in a desulfurization tower, is at least one species selected from activated carbon and activated carbon fiber. The apparatus contains an $NO_2$-gas-feeding apparatus for feeding $NO_2$ gas into the desulfurization tower. Within the desulfurization tower, a showering mechanism is provided at the top, the showering mechanism adjusting water content of the flue gas in the desulfurization tower to that corresponding to saturation with water vapor or higher at the treatment temperature.

19 Claims, 4 Drawing Sheets

U.S. PATENT DOCUMENTS

| | | | |
|---|---|---|---|
| 4,035,470 A | * | 7/1977 | Senjo et al. ................. 423/235 |
| 4,110,183 A | * | 8/1978 | Furuta et al. ............ 204/157.3 |
| 4,451,435 A | * | 5/1984 | Holter et al. ................ 422/171 |
| 4,541,999 A | * | 9/1985 | Bechthold et al. .......... 423/235 |
| 4,975,264 A | | 12/1990 | Franken |
| 6,106,791 A | * | 8/2000 | Mochida et al. ......... 423/239.1 |
| 6,162,409 A | * | 12/2000 | Skelley et al. ............ 423/239.1 |
| 6,521,200 B1 | * | 2/2003 | Silveston et al. ........ 423/512.1 |
| 6,616,905 B1 | * | 9/2003 | Sonehara et al. ...... 423/244.01 |
| 6,814,948 B1 | * | 11/2004 | Yasutake et al. ....... 423/244.03 |

OTHER PUBLICATIONS

I. Mochida et al., "Marked Increase of SO2 Removal Ability of Poly(acrylonitrile)-Based Active Carbon Fiber by Heat Treatment at Elevated Temperatures", Langmuir, vol. 8, pp. 2290-2294, 1992.*

* cited by examiner

DESULFURIZER COMPRISING ACTIVATED CARBON AND METHOD OF DESULFURIZATION

TECHNICAL FIELD

The present invention relates to a desulfurization apparatus for removing sulfur oxides contained in a flue gas generated by a boiler or a similar facility employing a fuel such as coal, and to a method for desulfurizing the flue gas.

BACKGROUND ART

Flue gases generated by boilers and thermal power stations employing a fuel such as coal or heavy oil, or by plants such as chemical-production plants, metal-processing plants, sintering plants, and paper-making plants contain a large amount of sulfur oxides such as sulfur dioxide. Among flue gas desulfurization methods for removing the sulfur oxides, there is disclosed a method in which a flue gas is brought into contact with a porous carbon material such as activated carbon or activated carbon fiber, to thereby cause the porous carbon material to adsorb sulfur oxides such as sulfur dioxide contained in the flue gas; the sulfur oxides are oxidized with oxygen contained in the flue gas in the presence of the porous carbon material serving as a catalyst; and the resultant oxides are absorbed in water, to thereby form sulfuric acid, which is removed from the carbon material (as disclosed in e.g., "Techniques and laws and regulations for Pollution Control," 3rd edition, air part 88, p. 112–113, Industrial Pollution control Association of Japan, and Japanese Patent Application Laid-Open (kokai) No. 10-230).

The reaction scheme of the desulfurization is as follows.

$$SO_2 + 1/2 O_2 + H_2O \rightarrow H_2SO_4 \qquad (1)$$

However, the desulfurization has a drawback in that, when nitrogen monoxide (NO) is contained in the flue gas, catalytic effect of the porous carbon material is deteriorated, thereby deteriorating desulfurization performance.

Specifically, FIG. 4 shows the relationship between NO content and the extent of the catalysis inhibition effect. As shown in FIG. 4, given that the amount of the porous carbon material catalyst is 1 when the NO content is 0 ppm, when NO content is 50 ppm the catalyst is required in an amount 1.2 times the above amount, and when NO content is 200 ppm the catalyst is required in an amount 1.5 times the above amount.

In other words, the desulfurization has a drawback in that an excess amount of porous carbon material must be used in order to maintain desulfurization performance, resulting in an increase in treatment costs.

In view of the foregoing, an object of the present invention is to provide a desulfurization apparatus which attains effective desulfurization without deteriorating desulfurization performance even when a flue gas to be desulfurized contains a microamount of NO. Another object of the invention is to provide a desulfurization method.

DISCLOSURE OF THE INVENTION

A first invention provides a desulfurization apparatus for desulfurizing a flue gas containing sulfur oxides through contact with a porous carbon material provided in a desulfurization tower, the porous carbon material being at least one species selected from activated carbon and activated carbon fiber, the apparatus being characterized by comprising an $NO_2$-gas-feeding apparatus for feeding $NO_2$ gas into the desulfurization tower.

According to the first invention, an $NO_2$-gas-feeding apparatus for feeding $NO_2$ gas into the desulfurization tower is provided. Therefore, an effect of NO inhibiting performance of the porous carbon material is suppressed, thereby effectively desulfurizing a flue gas containing sulfur oxides.

A second invention provides a desulfurization apparatus for desulfurizing a flue gas containing sulfur oxides through contact with a porous carbon material provided in a desulfurization tower, the porous carbon material being at least one species selected from activated carbon and activated carbon fiber, the apparatus being characterized by comprising an NO-oxidation apparatus for oxidizing NO contained in the flue gas to be fed into the desulfurization tower to thereby form $NO_2$, wherein the NO-oxidation apparatus is provided on the upstream side of the desulfurization tower.

According to the second invention, an NO-oxidation apparatus for oxidizing NO contained in the flue gas to be fed into the desulfurization tower to form $NO_2$ is provided on the upstream side of the desulfurization tower. Therefore, an effect of NO inhibiting performance of the porous carbon material is suppressed, thereby effectively desulfurizing a flue gas containing sulfur oxides.

A third invention is drawn to a specific embodiment of the desulfurization apparatus of the second invention, wherein the NO-oxidation apparatus employs an oxidation means selected from among an electric-discharge-oxidation means, an oxidation-catalyst-oxidation means, an ozone-oxidation means, a hydrogen-peroxide-oxidation means, and combinations thereof.

According to the third invention, which is drawn to a specific embodiment of the desulfurization apparatus of the second invention, the oxidation means employed in the NO-oxidation apparatus is selected from among an electric-discharge-oxidation means, an oxidation-catalyst-oxidation means, an ozone-oxidation means, a hydrogen-peroxide-oxidation means, and combinations thereof. Therefore, NO is oxidized at high efficiency.

A fourth invention is drawn to a specific embodiment of the desulfurization apparatus of the first or second invention, which further comprises oxidizing-aid-feeding means for feeding, into the desulfurization tower, at least one oxidizing aid selected from among air, oxygen, ozone, aqueous hydrogen peroxide, an aqueous nitric acid solution, an aqueous permanganic acid solution, an aqueous chloric acid solution, and an aqueous hypochlorous acid solution.

According to the fourth invention, which is drawn to a specific embodiment of the desulfurization apparatus of the first or second invention, there is provided oxidizing-aid-feeding means for feeding, into the desulfurization tower, at least one oxidizing aid selected from among air, oxygen, ozone, aqueous hydrogen peroxide, an aqueous nitric acid solution, an aqueous permanganic acid solution, an aqueous chloric acid solution, and an aqueous hypochlorous acid solution. By employment of the oxidizing aid, desulfurization effect is enhanced.

A fifth invention is drawn to a specific embodiment of the desulfurization apparatus of the first or second invention, wherein the porous carbon material has been hydrophobicized by heating at 600–1,200° C. in a non-oxidizing atmosphere.

According to the fifth invention, which is drawn to a specific embodiment of the desulfurization apparatus of the first or second invention, the porous carbon material has been hydrophobicized by heating at 600–1,200° C. in an non-oxidizing atmosphere. The thus-obtained hydrophobic surface facilitates adsorption of $SO_2$. In addition, the produced sulfuric acid can be removed at high efficiency, thereby promoting desulfurization reaction.

A sixth invention is drawn to a specific embodiment of the desulfurization apparatus of the first or second invention, which further comprises water-supply means for adjusting the water content of the flue gas in the desulfurization tower to that corresponding to saturation of water vapor or higher.

According to the sixth invention, which is drawn to a specific embodiment of the desulfurization apparatus of the first or second invention, there is provided water-supply means for adjusting the water content of the flue gas in the desulfurization tower to that corresponding to saturation of water vapor or higher. Therefore, desulfurization can be performed effectively.

A seventh invention provides a flue gas treatment system for purifying a flue gas discharged from a boiler, a thermal power station, any of a variety of plants, or similar facilities, the system being characterized by comprising a desulfurization apparatus as recited in any one of the first to sixth inventions provided on a flue gas discharge line.

According to the seventh invention, the flue gas treatment system for purifying a flue gas discharged from a boiler, a thermal power station, any of a variety of plants, or similar facilities, comprises a desulfurization apparatus as recited in any one of the first to sixth inventions provided on a flue gas discharge line. Therefore, the efficiency of flue gas treatment is enhanced.

An eighth invention is drawn to a specific embodiment of a flue gas treatment system of the seventh invention, which further comprises an $NO_x$-removing apparatus on the downstream side of the desulfurization apparatus.

According to the eighth invention, which is drawn to a specific embodiment of a flue gas treatment system of the seventh invention, an $NO_x$-removing apparatus is provided on the downstream side of the desulfurization apparatus. Therefore, desulfurization and $NO_x$ removal can be performed effectively.

A ninth invention is drawn to a specific embodiment of a flue gas treatment system of the seventh or eighth invention, which further comprises dust collecting means provided on any of the flue gas discharge lines.

According to the ninth invention, which is drawn to a specific embodiment of a flue gas treatment system of the seventh or eighth invention, dust collecting means is provided on any of the flue gas discharge lines. Therefore, in addition to desulfurization and $NO_x$ removal, dust collection can be performed, thereby purifying flue gas.

A tenth invention provides a desulfurization method for desulfurizing a flue gas containing sulfur oxides through contact with a porous carbon material provided in a desulfurization tower, the porous carbon material being at least one species selected from activated carbon and activated carbon fiber, wherein desulfurization is performed while an $NO_2$ gas is fed into the desulfurization tower.

According to the tenth invention, desulfurization is performed while an $NO_2$ gas is fed into the desulfurization tower. Therefore, inhibitory effect of NO for the porous carbon material is suppressed, thereby effectively desulfurizing a flue gas containing sulfur oxides.

An eleventh invention provides a desulfurization method for desulfurizing a flue gas containing sulfur oxides through contact with a porous carbon material provided in a desulfurization tower, the porous carbon material being at least one species selected from activated carbon and activated carbon fiber, wherein NO contained in the flue gas to be fed into the desulfurization tower is oxidized to form $NO_2$, followed by desulfurization.

According to the eleventh invention, NO contained in the flue gas to be fed into the desulfurization tower is oxidized to thereby form $NO_2$, followed by desulfurization. Therefore, an effect of NO inhibiting performance of the porous carbon material is suppressed, thereby effectively desulfurizing a flue gas containing sulfur oxides.

A twelfth invention is drawn to a specific embodiment of the desulfurization method of the eleventh invention, wherein the NO-oxidation apparatus employs an oxidation means selected from among an electric-discharge-oxidation means, an oxidation-catalyst-oxidation means, an ozone-oxidation means, an hydrogen-peroxide-oxidation means, and combinations thereof.

According to the twelfth invention, which is drawn to a specific embodiment of the desulfurization method of the eleventh invention, the oxidation means employed in the NO-oxidation apparatus is selected from among an electric-discharge-oxidation means, an oxidation-catalyst-oxidation means, an ozone-oxidation means, an hydrogen-peroxide-oxidation means, and combinations thereof. Therefore, NO is oxidized at high efficiency.

A thirteenth invention is drawn to a specific embodiment of the desulfurization method of the eleventh invention, wherein oxidizing-aid-feeding means is provided for feeding, into the desulfurization tower, at least one oxidizing aid selected from among air, oxygen, ozone, aqueous hydrogen peroxide, an aqueous nitric acid solution, an aqueous permanganic acid solution, an aqueous chloric acid solution, and an aqueous hypochlorous acid solution.

According to the thirteenth invention, which is drawn to a specific embodiment of the desulfurization method of the eleventh invention, there is provided oxidizing-aid-feeding means for feeding, into the desulfurization tower, at least one oxidizing aid selected from among air, oxygen, ozone, aqueous hydrogen peroxide, an aqueous nitric acid solution, an aqueous permanganic acid solution, an aqueous chloric acid solution, and an aqueous hypochlorous acid solution. By employment of the oxidizing aid, desulfurization effect is enhanced.

A fourteenth invention is drawn to a specific embodiment of the desulfurization method of the tenth or eleventh invention, wherein the porous carbon material has been hydrophobicized by heating at 600–1,200° C. in an non-oxidizing atmosphere.

According to the fourteenth invention, which is drawn to a specific embodiment of the desulfurization method of the tenth or eleventh invention, the porous carbon material has been hydrophobicized by heating at 600–1,200° C. in an non-oxidizing atmosphere. The thus-obtained hydrophobic surface facilitates adsorption of $SO_2$. In addition, the produced sulfuric acid can be removed at high efficiency, thereby promoting desulfurization reaction.

A fifteenth invention is drawn to a specific embodiment of the desulfurization method of the tenth or eleventh invention, wherein water-supply means is provided for adjusting the water content of the flue gas in the desulfurization tower to that corresponding to saturation of water vapor or higher.

According to the fifteenth invention, which is drawn to a specific embodiment of the desulfurization method of the tenth or eleventh invention, there is provided water-supply means for adjusting the water content of the flue gas in the desulfurization tower to that corresponding to saturation of water vapor or higher. Therefore, desulfurization can be performed effectively.

BEST MODES FOR CARRYING OUT THE INVENTION

In order to describe the present invention in more detail, the best modes for carrying out the invention will next be described with reference to the drawings appended hereto. However, the present invention is not limited to these modes.

[First Embodiment]

Figure 1:
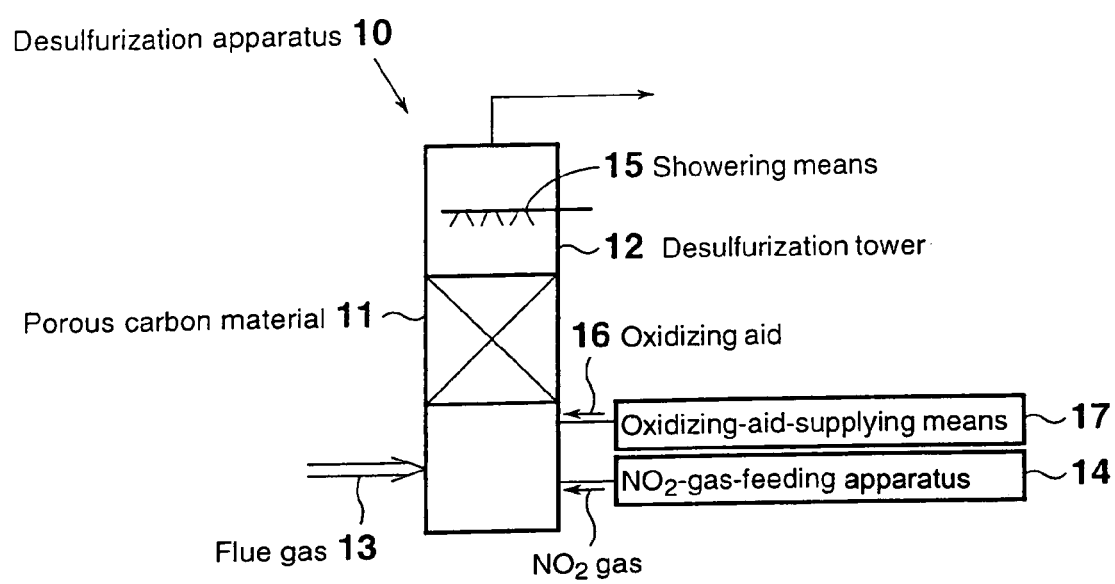
FIG. 1 is a schematic view of a flue gas desulfurization apparatus according to a first embodiment.

FIG. 1 is a schematic view of a flue gas desulfurization apparatus according to a first embodiment. As shown in FIG. 1, a desulfurization apparatus 10 of the first embodiment for desulfurizing a flue gas 13 containing sulfur oxides through contact with a porous carbon material 11 provided in a desulfurization tower 12, the porous carbon material 11 being at least one species selected from activated carbon and activated carbon fiber, contains an $NO_2$-gas-feeding apparatus 14 for feeding $NO_2$ gas into the desulfurization tower 12. Within the desulfurization tower 12, showering means 15 is provided at the top, the showering means adjusting the water content of the flue gas in the desulfurization tower to that corresponding to saturation with water vapor or higher at the treatment temperature.

The aforementioned porous carbon material 11 adsorbs sulfur oxides contained in the flue gas and serves as an oxidation catalyst.

No particular limitation is imposed on the type of activated carbon used as the porous carbon material 11, and a variety of known activated carbon species can be used. Examples of the activated carbon species include those produced from raw material such as coconut husks, coke, and pitch. These activated carbon species can be produced through any known methods. Generally, these can be produced through steam-activation of the raw material. Although customary commercial activated carbon having a specific surface area of approximately 700 m²/g or more can be used in the present invention, activated carbon species having a comparatively large specific surface area; e.g., approximately 1,500 m²/g or more, are particularly preferred.

No particular limitation is imposed on the type of activated carbon fiber, and known activated carbon fibers such as those produced from pitch, polyacrylonitrile, phenol, or cellulose can be used. Commercial carbon fiber products can also be used. Among them, activated carbon fiber species having a comparatively large specific surface area; e.g., approximately 1,000 m²/g or more, are preferred. Activated carbon fiber species having high surface hydrophobicity such as those produced from pitch are also preferred.

The carbon materials selected from the aforementioned activated carbon species and activated carbon fiber species may be used, singly or in combination of two or more species, as the porous carbon material of the present invention.

The porous carbon material which is used in the present invention is preferably hydrophobicized. Specifically, the carbon material can be hydrophobicized by heating at approximately 600–1,200° C. in a non-oxidizing atmosphere such as nitrogen gas or argon gas for approximately 0.5–5 hours. Through such heat treatment, a portion or the entirety of oxygen-containing functional groups serving as hydrophilic groups and contained in the porous carbon material are removed in forms such as CO and $CO_2$. Thus, the surface of the porous carbon material becomes more hydrophobic as compared with the state before the heat treatment. The thus-obtained hydrophobic surface facilitates oxidation of $SO_2$ and adsorption of $SO_2$ onto activated carbon, and the produced sulfuric acid can be removed at high efficiency, thereby promoting catalytic desulfurization reaction.

In the method of the present invention, the sulfur-oxide-containing flue gas to be treated is brought into contact with the aforementioned porous carbon material, to thereby achieve desulfurization. The sulfur oxide contained in the flue gas that has been in contact with the porous carbon material is adsorbed to the porous carbon material. The adsorbed sulfur oxide is reacted with water and oxygen contained in the flue gas, forming sulfuric acid in accordance with the following scheme (1).

$$SO_2 + 1/2 O_2 + H_2O \rightarrow H_2SO_4 \tag{1}$$

In addition, since $NO_2$ gas is intentionally fed into the desulfurization tower 12 from the $NO_2$-gas-feeding apparatus 14, inhibitory effect of NO against oxidation of $SO_2$ is suppressed, and $SO_2$ is reacted to from $SO_3$ and NO in accordance with the following scheme (2):

$$SO_2 + NO_2 \rightarrow SO_3 + NO \tag{2},$$

leading to effective proceeding of desulfurization reaction.

In the reaction, supply of $NO_2$ gas results in formation of NO. However, in order to meet environmental quality standards, NO is removed through insertion of the below-mentioned $NO_x$-removing apparatus.

The method for bringing a flue gas containing sulfur oxide into contact with a porous carbon material is not limited to a method based on the configuration shown in FIG. 1, and any known method can be appropriately employed. Specifically, a flue gas is brought into contact with a porous carbon material through a customary method making use of a known reactor such as an immobilized-bed flow reactor, a fluidized-bed reactor, or an agitation reactor.

No particular limitation is imposed on the type of flue gas to be treated, and the target flue gases for treatment include all the flue gases containing sulfur oxides such as $SO_2$; e.g., flue gases generated by boilers and thermal power stations employing a fuel such as coal or heavy oil, or flue gases generated by plants such as chemical-production plants, metal-processing plants, sintering plants, and paper-making plants. No particular limitation is imposed on the $SO_2$ content of the flue gas. Generally, a flue gas can be desulfurized though the method of the present invention so long as the $SO_2$ content is approximately 100–2,000 ppm (typical level). In relation to the water content of the flue gas, when a flue gas has a water content of approximately 7.5 vol. % or more (typical level), the gas can be treated. A small amount of water is preferably supplied so as to promote desulfurization. Particularly, water is preferably supplied such that the water content of the flue gas is adjusted to that corresponding to saturation with water vapor or more at the treatment temperature.

Even when the water content of the flue gas is insufficient, treatment of the gas is possible if an appropriate amount of water is supplied by means of showering means 15 or similar means.

In addition to the aforementioned gas components, other gas components may coexist without posing particular problems, so long as the gases do not inhibit desulfurization reaction. For example, coexistence of nitrogen, carbon dioxide, or carbon monoxide poses no problems.

Furthermore, an oxidizing aid 16 can be supplied into the desulfurization tower 12 through oxidizing-aid-supplying means 17. By supply of the oxidizing aid, the oxidizing aid is incorporated into the flue gas during contact with the porous carbon material, thereby shifting the equilibrium of the reaction of the aforementioned scheme (1) to the right side, further promoting sulfuric acid formation; i.e., removal of $SO_2$.

Any oxidizing aid which is in gaseous form at ambient temperature or in liquid form at ambient temperature may be used as the oxidizing aid 16.

Examples of oxidizing aids which are in gaseous form at ambient temperature include air, oxygen, and ozone. Examples of oxidizing aids which are in liquid form at ambient temperature and can be used in the present invention include aqueous hydrogen peroxide, an aqueous nitric acid solution, an aqueous permanganic acid solution, an aqueous chloric acid solution, and an aqueous hypochlorous acid solution. In the present invention, oxidizing aids such as air, oxygen, ozone, aqueous hydrogen peroxide, an aqueous nitric acid solution, an aqueous permanganic acid solution, an aqueous chloric acid solution, and an aqueous hypochlorous acid solution, as described above, can be used singly or in combination of two or more species. Furthermore, a gaseous-form oxidizing aid and a liquid-form oxidizing aid may be used in combination.

The oxidizing aids which are in gaseous form at ambient temperature may be blown into a flue gas from a gas inlet of the desulfurization apparatus by means of a fan, a blower, a pressure feeder, etc. The oxidizing aids which are in liquid form at ambient temperature may be injected into a flue gas from a gas inlet of the desulfurization apparatus by means of a liquid-feeding pump, etc. Typically, the liquid-form oxidizing aids are added to replenishment water for supplying water to the flue gas, and the resultant mixture is atomized, to form a mist, which is then added to the flue gas.

Among these oxidizing aids, air, oxygen, etc. serve as a source for directly compensating oxygen deficiency and can elevate the oxygen content of the flue gas when added thereto. Air or oxygen may be added in an amount such that the resultant flue gas attains an oxygen content of approximately 5 vol. % or more, preferably approximately 8 vol. % or more. Since flue gases generally contain oxygen at a concentration of approximately 3 vol. % or more, the oxygen deficiency is compensated through addition of air or oxygen. Typically, atmospheric air can be used. In relation to oxygen, oxygen obtained from a source such as an oxygen bomb, liquid oxygen in a tank, or an oxygen generator may be used. In view that the atmosphere has an oxygen content of approximately 21%, when oxygen is used, the oxygen may be supplied in an amount of approximately ⅕ times the amount of air required.

Ozone—having a remarkably high oxidation ability—directly oxidizes $SO_2$ and decomposes on the surface of the porous carbon material, to thereby generate oxygen. Since ozone has an oxidation ability much higher than that of oxygen, the amount of ozone required to be added is smaller than that of oxygen to be added. Specifically, ozone is added in an amount such that the ozone content is adjusted to be comparable to the $SO_2$ content of the flue gas to be treated, typically such that the ozone content of the flue gas falls within a range of approximately 100 to 2,000 ppm. Ozone produced from a typical ozonizer for producing ozone by irradiating air with UV rays or similar radiation may be used.

Among liquid-form oxidizing aids, aqueous hydrogen peroxide is similar to ozone, in that it has a high oxidation ability, oxidizes $SO_2$, and generates oxygen. An aqueous nitric acid solution oxidizes $SO_2$ by its strong oxidation ability, thereby promoting formation of sulfuric acid. Similarly, aqueous acid solutions such as an aqueous permanganic acid solution, an aqueous chloric acid solution, and an aqueous hypochlorous acid solution have oxidation ability and decompose on the surface of the porous carbon material, thereby generating oxygen. A portion of the thus-generated oxygen gas is dissolved in each aqueous solution, to thereby form dissolved oxygen, which is remarkably effective for formation of aqueous sulfuric acid.

The liquid-form oxidizing aid is diluted with water, to thereby form an aqueous solution thereof, and the solution is added to the flue gas via spraying. Typically, the liquid-form oxidizing aid is added to replenishment water for supplying water to the flue gas, and the resultant mixture is added. No particular limitation is imposed on the concentration of the aqueous solution of a liquid-form oxidizing aid that is added to the flue gas. The effective component concentration of each aqueous solutions (e.g., aqueous hydrogen peroxide, an aqueous nitric acid solution, and an aqueous permanganic acid solution) is preferably adjusted to approximately 0.1–10 wt. %. The effective component concentration of each aqueous solution (e.g., an aqueous chloric acid solution and an aqueous hypochlorous acid solution) is preferably adjusted to approximately 0.1–20 wt. %. However, in order to store such an aqueous solution in the vicinity of a flue-gas-generating facility, a liquid tank of large capacity is required. Thus, preferably, an aqueous solution containing the liquid-form oxidizing aid having a concentration of approximately 20–40 wt. % is stored, the solution is diluted with water before use thereof, and the diluted solution is added to the flue gas.

The amount of the added liquid-form oxidizing aid is smaller than that of the added gas-form oxidizing aid, and the liquid-form oxidizing aid is added only in an amount such that the effective component amount of the oxidizing aid is equimol (chemical equivalent) or less based on the amount of $SO_2$ to be treated. Typically, the liquid-form oxidizing aid is added in an amount such that the effective component of the oxidizing aid is contained in the flue gas in an amount of approximately 0.1–10 vol. % as reduced to the amount of its vaporized species.

Among the aforementioned oxidizing aids, at least one species selected from among ozone, aqueous hydrogen peroxide, an aqueous nitric acid solution, an aqueous permanganic acid solution, an aqueous chloric acid solution, and an aqueous hypochlorous acid solution is preferably used in the present invention, since these oxidizing aids effectively remove sulfur oxides by use thereof in small amounts.

The treatment temperature during desulfurization must be appropriately adjusted in accordance with the type of the porous carbon material employed, the water content of the flue gas, the $SO_2$ content, and other factors. In general, treatment temperatures of approximately 20–100° C. are suitable. Particularly in the present invention, desulfurization can be performed effectively even at ambient temperatures or thereabouts of approximately 30–60° C. Even when the treatment temperature is as high as 100° C. or higher, desulfurization can be performed by intermittently adding a large amount of water through showering or similar means.

The flow rate of the gas during desulfurization is appropriately adjusted in accordance with the $SO_2$ content, the type of the desulfurization apparatus employed, and other factors. Generally, the gas is preferably passed under conditions such that W/F (wherein W denotes the weight of porous carbon material and F denotes the flow rate of gas) falls within a range of approximately $1 \times 10^{-3}$ to $5 \times 10^{-3}$ g·min/ml.

[Second Embodiment]

Figure 2:
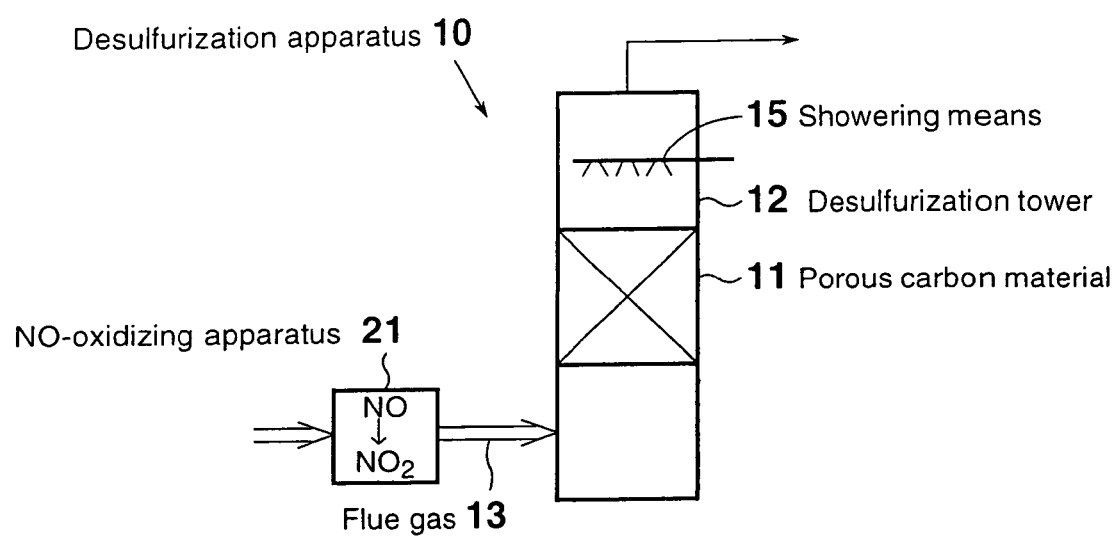
FIG. 2 is a schematic view of a flue gas desulfurization apparatus according to a second embodiment.

FIG. 2 is a schematic view of a flue gas desulfurization apparatus according to a second embodiment. Those elements that are also employed in the first embodiment are denoted by the same reference numerals, and descriptions thereof are omitted.

As shown in FIG. 2, a desulfurization apparatus 10 of the second embodiment for desulfurizing a flue gas 13 containing sulfur oxides through contact with a porous carbon material 11 provided in a desulfurization tower 12, the porous carbon material 11 being at least one species selected from activated carbon and activated carbon fiber, contains an NO-oxidizing apparatus 21 for oxidizing NO contained in the flue gas 13 to be fed into the desulfurization tower 12 to form $NO_2$, the NO-oxidizing apparatus 21 being provided on the upstream side of the desulfurization tower 12.

In contrast to the first embodiment, in the second embodiment, NO contained in the flue gas 13 which has not yet been fed to the desulfurization tower 12 is oxidized in advance by means of the NO-oxidizing apparatus 21, thereby transforming into $NO_2$. Thus, an effect of NO inhibiting performance of the porous carbon material 11 during desulfurization by means of the porous carbon material 11 is suppressed, thereby effectively performing desulfurization.

A variety of oxidation means can be employed as the means for oxidizing NO to $NO_2$, and examples thereof include electric-discharge-oxidation means, oxidation-catalyst means, ozone-oxidation means, hydrogen-peroxide-oxidation means, and combinations thereof. Examples of the oxidation catalyst include $MnO_2$, $V_2O_5$, and $Cr_2O_3$.

Similar to the case of the first embodiment, desulfurization efficiency can be enhanced by supplying an oxidizing aid by means of oxidizing-aid-supplying means.

[Third Embodiment]

Figure 3:
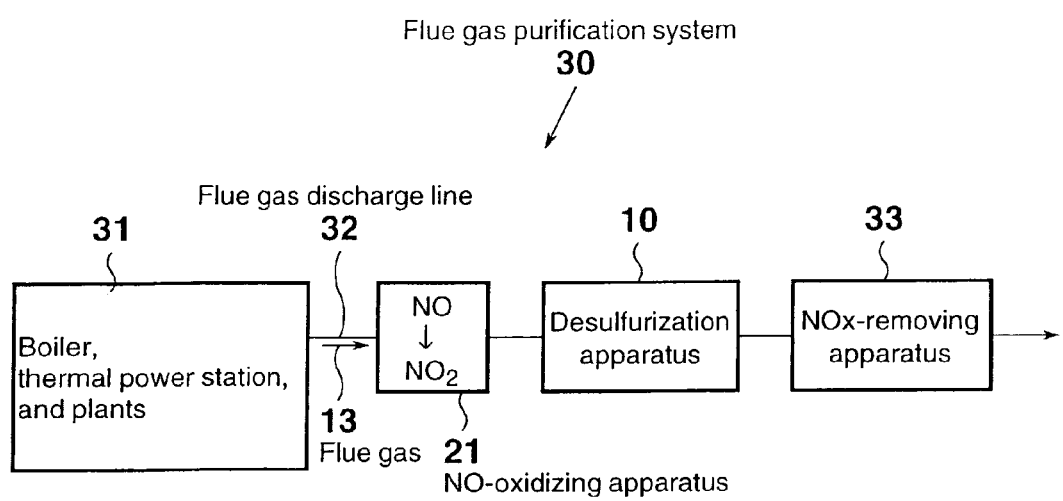
FIG. 3 is a diagram showing a flue gas treatment system provided with a flue gas desulfurization apparatus according to a third embodiment.
Figure 4:
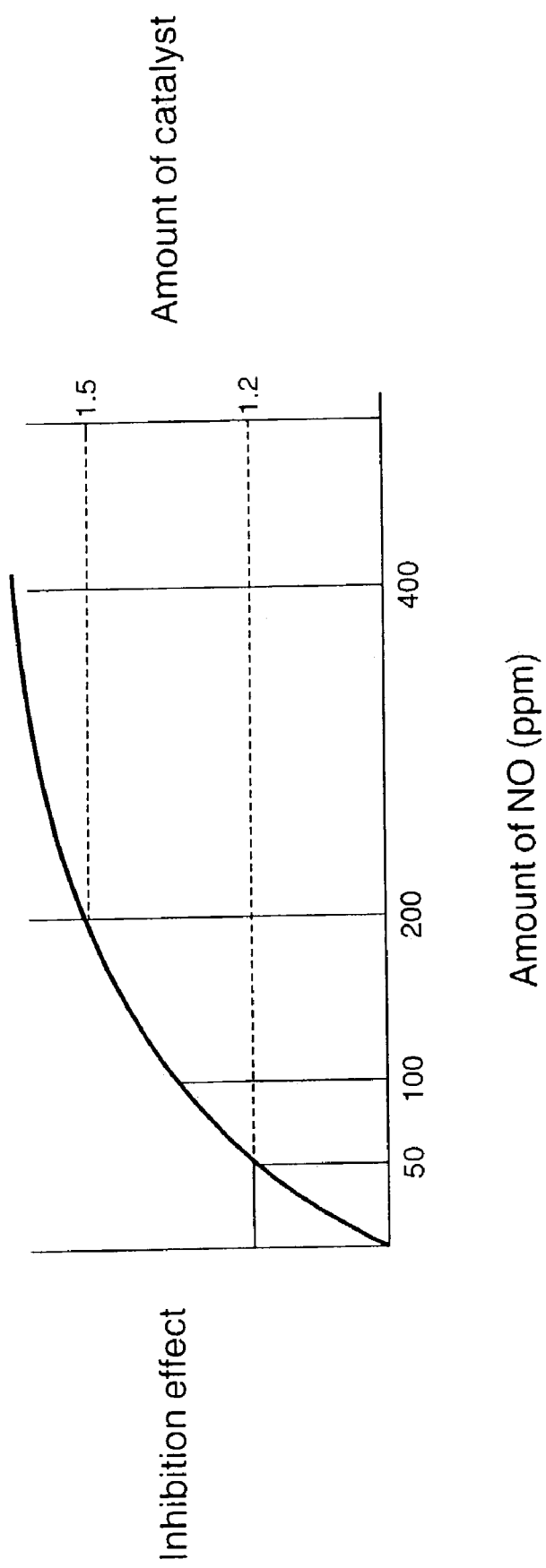
FIG. 4 is a graph showing the relationship between NO content and the amount of catalyst.

FIG. 3 is a diagram showing a flue gas treatment system provided with a flue gas desulfurization apparatus according to a third embodiment. As shown in FIG. 3, the system 30 of the third embodiment comprises NO-oxidizing apparatus 21 for oxidizing NO contained in a flue gas 13 discharged on a flue gas discharge line 32 from a boiler, a thermal power station, any of a variety of plants, or similar facilities 31, to form $NO_2$; the aforementioned desulfurization apparatus 10; and an $NO_x$-removing apparatus 33.

In this system, NO contained in the flue gas is oxidized in advance by means of the NO-oxidizing apparatus 21, thereby transforming into $NO_2$. Thus, an effect of NO inhibiting performance of the porous carbon material during desulfurization carried out in the desulfurization apparatus 10 is suppressed, thereby increasing desulfurization efficiency.

Through desulfurization, the temperature of the flue gas 13 is lowered. Thus, an $NO_x$-removing apparatus which operates at low temperature is preferably employed as the $NO_x$-removing apparatus 33.

In order to remove dust contained in the flue gas, dust collecting means is provided between predetermined sites, thereby effectively removing dust.

As described hereinabove, the present invention is particularly suited for removing sulfur oxides contained in flue gases generated by boilers and thermal power stations employing a fuel such as coal or heavy oil; and flue gases generated by plants such as chemical-production plants, metal-processing plants, sintering plants, and paper-making plants.

EXAMPLES AND COMPARATIVE EXAMPLES

The present invention will next be described in more detail by way of examples.

Granular activated carbon (particle size: 8–32 mesh, specific surface area 800 m²/g) was employed as a porous carbon material. The activated carbon was heated in advance at 1,000° C. in a nitrogen atmosphere, to thereby impart a hydrophobic surface to the activated carbon. Subsequently, desulfurization was performed by use of the thus-prepared activated carbon through the following method, and desulfurization performance was investigated.

An immobilized-bed-flow-type desulfurization apparatus was employed. A gas having predetermined compositional conditions at an inlet ($SO_2$: 800 ppm, water content: 13.5 vol. % (higher than saturation), $O_2$: 3.8 vol. %, $CO_2$: 8 vol. %, and balance: $N_2$) was caused to flow at 50° C. such that W/F (wherein W denotes the weight of porous carbon material and F denotes the flow rate of gas) was controlled to $2.5 \times 10^{-3}$ g·min/ml, and desulfurization of the gas was carried out.

The $SO_2$ content of the apparatus outlet gas was measured by means of a non-dispersion infrared $SO_2$-meter, and percent desulfurization (=precent removal of $SO_2$) was calculated.

Comparative Example 1

Desulfurization was performed in the above manner, except that no oxidizing aid was used. Percent desulfurization 50 hours after initiation of desulfurization was measured.

Example 1

Desulfurization was repeated in the same manner as described above, except that $NO_2$ gas was fed in an amount such that the oxygen content of the entire reactive gas was adjusted to 800 ppm. Percent desulfurization 50 hours after initiation of desulfurization was measured.

The results are shown in Table 1.

TABLE 1

|  |  | Comparative Example 1 None | Example 1 $NO_2$ |
|---|---|---|---|
| Concentration | ppm | — | 800 |
| Percent removal of $SO_x$ | % | 95 | 98 |
| SV value | h$^{-1}$ | 1,000 | 5,000 |
| Relative amount of catalyst | — | 1 | 0.2 |

*Gas conditions
$SO_2$ 800 ppm
$H_2O$: 13.5% (higher than saturation)
$O_2$: 3.8%
$CO_2$: 8%
Balance: nitrogen As shown in Table 1, efficiency of removing sulfur oxides contained in the flue gas (i.e., desulfurization) could be enhanced by feeding $NO_2$ gas, and desulfurization could be performed generally at a percent desulfurization of approximately 98% or higher.

Comparative Example 2

Desulfurization was repeated in the same manner as described above, except that the aforementioned gas was modified such that the NO content was adjusted to 200 ppm. Percent desulfurization 50 hours after initiation of desulfurization was measured.

Comparative Example 3

Desulfurization was repeated in the same manner as described above, except that ozone serving as an oxidizing aid was blown from an ozonizer to reaction gas in an amount such that the ozone content of the entire reaction gas was adjusted to 1,000 ppm. Percent desulfurization 50 hours after initiation of desulfurization was measured.

Comparative Example 4

Desulfurization was repeated in the same manner as described above, except that oxygen serving as an oxidizing aid was fed to reaction gas in an amount such that the oxygen content of the entire reaction gas was adjusted to 8 vol. %. Percent desulfurization 50 hours after initiation of desulfurization was measured.

The results are shown in Table 2.

TABLE 2

| | | In the presence of NO | | |
|---|---|---|---|---|
| | | Comparative Example 2 None | Comparative Example 3 Ozone | Comparative Example 4 Oxygen |
| Concentration | ppm | — | 1,000 | 8% |
| Percent removal of $SO_x$ | % | 95 | 96 | 95 |
| SV value | $h^{-1}$ | 500 | 1,200 | 800 |
| Relative amount of catalyst | — | 1 | 0.42 | 0.625 |

*Gas conditions
$SO_2$: 800 ppm
$H_2O$: 13.5% (higher than saturation)
$O_2$: 3.8%
$CO_2$: 8%
Balance: nitrogen As shown in Table 2, inhibition of the catalyst due to NO and decrease in SV value were observed. No remarkable effect of oxidizing aids commensurate with addition was exerted.

Example 2

Desulfurization was repeated in the same manner as described above, except that NO (200 ppm) had been transformed into $NO_2$ (200 ppm) in advance and no oxidizing aid was used. Percent desulfurization 50 hours after initiation of desulfurization was measured.

Example 3

Desulfurization was repeated in a manner similar to that of Example 2, except that NO (200 ppm) had been transformed into $NO_2$ (200 ppm) in advance and ozone (1,000 ppm) serving as an oxidizing aid was used. Percent desulfurization 50 hours after initiation of desulfurization was measured.

Example 4

Desulfurization was repeated in a manner similar to that of Example 2, except that NO (200 ppm) had been transformed into $NO_2$ (200 ppm) in advance and oxygen (8%) serving as an oxidizing aid was used. Percent desulfurization 50 hours after initiation of desulfurization was measured.

The results are shown in Table 3.

TABLE 3

| | | Co-existing NO was transformed into $NO_2$ in advance | | |
|---|---|---|---|---|
| | | Example 2 None | Example 3 Ozone | Example 4 Oxygen |
| Concentration | ppm | — | 1,000 | 8% |
| Percent removal of $SO_x$ | % | 95 | 96 | 95 |
| SV value | $h^{-1}$ | 1,000 | 2,000 | 1,300 |
| Relative amount of catalyst | — | 0.5 | 0.5 | 0.77 |

*Gas conditions
$SO_2$: 800 ppm
$H_2O$: 13.5% (higher than saturation)
$O_2$: 3.8%
$CO_2$: 8%
Balance: nitrogen The results indicate that, according to the present invention, sulfur oxides contained in a flue gas can be removed at high efficiency by transforming NO into $NO_2$ in advance or by intentionally supplying $NO_2$, even when the flue gas contains a microamount of NO. Effect of use of oxygen in combination has been also confirmed.

INDUSTRIAL APPLICABILITY

As described hereinabove, the present invention suitably provides a desulfurization apparatus for desulfurizing a flue gas containing sulfur oxides through contact with a porous carbon material provided in a desulfurization tower, the porous carbon material being at least one species selected from activated carbon and activated carbon fiber, wherein an effect of NO inhibiting performance of the porous carbon material is suppressed by feeding $NO_2$ gas into the desulfurization tower or by oxidizing NO contained in the flue gas to be fed into the desulfurization tower, thereby effectively desulfurizing the flue gas containing sulfur oxides.

The invention claimed is:

1. A desulfurization apparatus for desulfurizing a flue gas containing sulfur oxides through contact with a porous carbon material provided in a desulfurization tower, the porous carbon material being at least one species selected from the group consisting of activated carbon and activated carbon fiber, the apparatus comprising:
   said desulfurization tower containing said porous material;
   a flue gas inlet configured to supply the flue gas containing sulfur oxides to the desulfurization tower; and
   an $NO_2$-gas-feeding apparatus for feeding $NO_2$ gas into the desulfurization tower.

2. A desulfurization apparatus according to claim 1, which further comprises oxidizing-aid-feeding means for feeding, into the desulfurization tower, at least one oxidizing aid selected from the group consisting of air, oxygen, ozone, aqueous hydrogen peroxide, an aqueous nitric acid solution, an aqueous permanganic acid solution, an aqueous chloric acid solution, and an aqueous hypochlorous acid solution.

3. A desulfurization apparatus according to claim 1, wherein the porous carbon material has been hydrophobicized by heating at 600–1,200° C. in a non-oxidizing atmosphere.

4. A desulfurization apparatus according to claim 1, which further comprises water-supply means for adjusting water content of the flue gas in the desulfurization tower to that corresponding to saturation of water vapor or higher.

5. A flue gas treatment system for purifying a flue gas discharged from a boiler, a thermal power station, or a sulfur-oxide-generating industrial plant, the system comprising the desulfurization apparatus as recited in claim 1 provided on a flue gas discharge line.

6. A flue gas treatment system according to claim 5, which further comprises an $NO_x$-removing apparatus on the downstream side of the desulfurization apparatus.

7. A flue gas treatment system according to claim 6, which further comprises dust collecting means provided on the flue gas discharge line.

8. A flue gas treatment system according to claim 5, which further comprises dust collecting means provided on the flue gas discharge line.

9. A desulfurization method for desulfurizing a flue gas containing sulfur oxides through contact with a porous carbon material provided in a desulfurization tower, the porous carbon material being at least one species selected from the group consisting of activated carbon and activated carbon fiber, the method comprising:
   providing a desulfurization tower containing the porous carbon material;
   supplying the flue gas containing sulfur oxides to the desulfurization tower; and
   feeding, separate from the flue gas, an $NO_2$ gas into the desulfurization tower.

10. A desulfurization method according to claim 9, wherein the porous carbon material has been hydrophobicized by heating at 600–1,200° C. in an non-oxidizing atmosphere.

11. A desulfurization method according to claim 9, wherein water-supply means is provided for adjusting the water content of the flue gas in the desulfurization tower to that corresponding to saturation of water vapor or higher.

12. A desulfurization apparatus for desulfurizing a flue gas containing sulfur oxides through contact with a porous carbon material provided in a desulfurization tower, the porous carbon material being at least one species selected from the group consisting of activated carbon and activated carbon fiber, the apparatus comprising said desulfurization tower containing said porous material and an NO-oxidation apparatus for oxidizing NO contained in the flue gas to be fed into the desulfurization tower to thereby form $NO_2$, the NO-oxidation apparatus being provided upstream of the desulfurization tower and comprising an oxidation means selected from the group consisting of an electric-discharge-oxidation means, an oxidation-catalyst-oxidation means, a hydrogen-peroxide-oxidation means, and combinations thereof.

13. A desulfurization apparatus according to claim 12, which further comprises oxidizing-aid-feeding means for feeding, into the desulfurization tower, at least one oxidizing aid selected from the group consisting of air, oxygen, ozone, aqueous hydrogen peroxide, an aqueous nitric acid solution, an aqueous permanganic acid solution, an aqueous chloric acid solution, and an aqueous hypochlorous acid solution.

14. A desulfurization apparatus according to claim 12, wherein the porous carbon material has been hydrophobicized by heating at 600–1,200° C. in a non-oxidizing atmosphere.

15. A desulfurization apparatus according to claim 12, which further comprises water-supply means for adjusting water content of the flue gas in the desulfurization tower to that corresponding to saturation of water vapor or higher.

16. A desulfurization method for desulfurizing a flue gas containing sulfur oxides through contact with a porous carbon material provided in a desulfurization tower, the porous carbon material being at least one species selected from the group consisting of activated carbon and activated carbon fiber, wherein NO contained in the flue gas to be fed into the desulfurization tower is oxidized in a NO-oxidation apparatus to form $NO_2$, followed by desulfurization, wherein the NO-oxidation apparatus employs an oxidation means selected from the group consisting of an electric-discharge-oxidation means, an oxidation-catalyst-oxidation means, an hydrogen-peroxide-oxidation means, and combinations thereof.

17. A desulfurization method according to claim 16, wherein oxidizing-aid-feeding means is provided for feeding, into the desulfurization tower, at least one oxidizing aid selected from the group consisting of air, oxygen, ozone, aqueous hydrogen peroxide, an aqueous nitric acid solution, an aqueous permanganic acid solution, an aqueous chloric acid solution, and an aqueous hypochlorous acid solution.

18. A desulfurization method according to claim 16, wherein the porous carbon material has been hydrophobicized by heating at 600–1,200° C. in an non-oxidizing atmosphere.

19. A desulfurization method according to claim 16, wherein water-supply means is provided for adjusting the water content of the flue gas in the desulfurization tower to that corresponding to saturation of water vapor or higher.

* * * * *